E. E. REDDEN.
CUSHIONED WHEEL.
APPLICATION FILED AUG. 20, 1918.

1,301,604.

Patented Apr. 22, 1919.

WITNESS:

INVENTOR.
Eugene E. Redden,
BY
Harry W. Bown.
ATTORNEY.

UNITED STATES PATENT OFFICE.

EUGENE E. REDDEN, OF SPRINGFIELD, MASSACHUSETTS.

CUSHIONED WHEEL.

1,301,604.  Specification of Letters Patent.  Patented Apr. 22, 1919.

Application filed August 20, 1918. Serial No. 250,674.

*To all whom it may concern:*

Be it known that I, EUGENE E. REDDEN, a citizen of the United States, residing at Springfield, in the county of Hampden and Commonwealth of Massachusetts, have invented certain new and useful Improvements in Cushioned Wheels, a specification of which is as follows.

This invention relates to improvements in wheels for use upon automobiles of the type known as flexible or cushion wheels in which the tires employed are solid rubber or cushion. In the present invention the use of a pneumatic tire is entirely dispensed with, and, in its place is substituted a solid rubber tire which serves as a tread and, concentric therewith a second ring of solid rubber with suitable devices for retaining the parts of the wheel just referred to in place.

Broadly, the invention comprises, in addition to the two rings of solid rubber, members that are preferably cup-shaped for receiving rubber cushions and which are associated with the rims and tires for absorbing the shocks incident to travel over the roadway. Suitable means is employed for retaining the tire and the various parts in place as will be fully described in the body of the specification.

Referring to the drawings.

Figure 1:
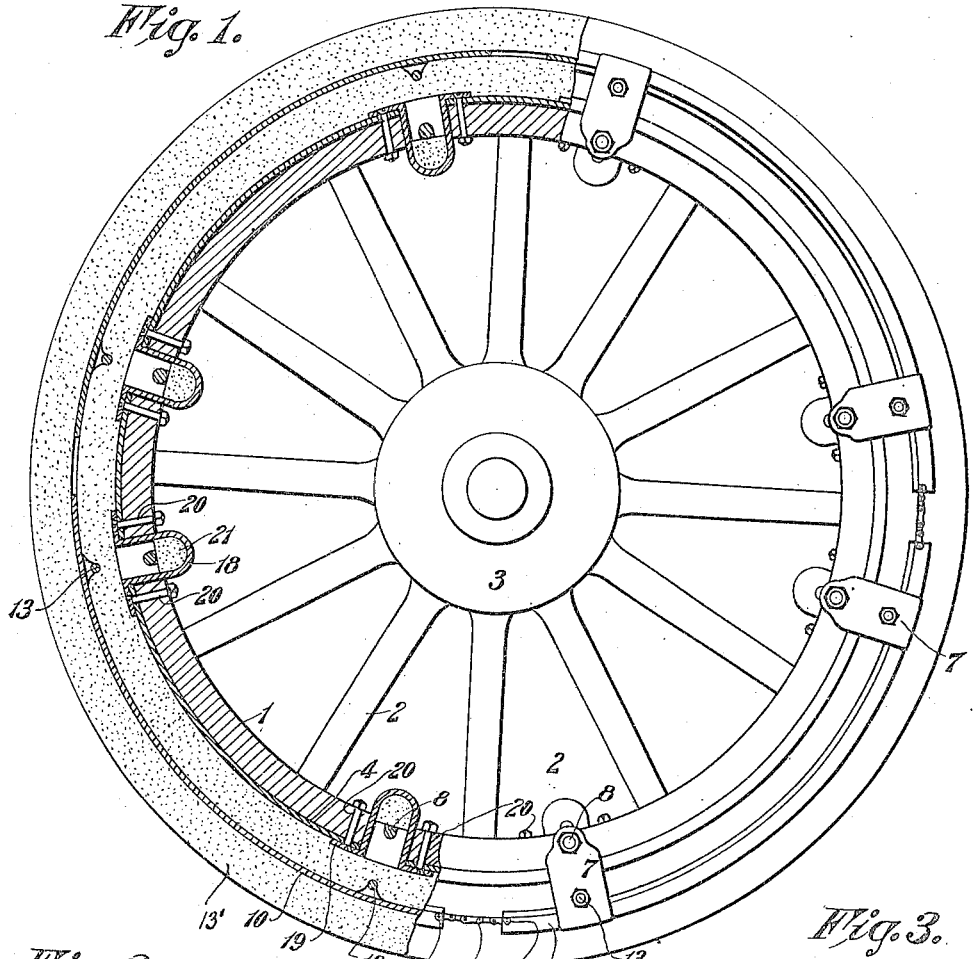
Figure 1 is a side elevational view of the completed wheel with parts of the same shown in section and illustrating the arrangement and location of the cup-shaped cushion members and the flexible connections for securing the sectional metal inserts between the solid rubber tire and the ring of solid or cushion rubber on the tire of the felly.
Figure 2:
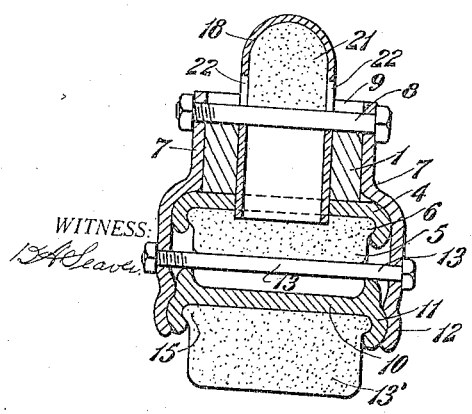
Fig. 2 is a sectional view on the line 2—2 of Fig. 1 showing the operative relation of the parts.
Figure 3:
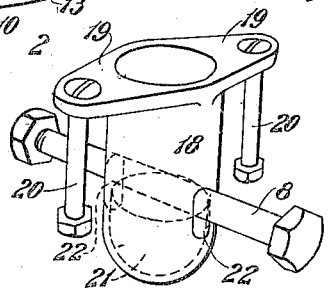
Fig. 3 is a detail perspective view of the cup-shaped cushion receiving member.

Referring to the drawings in detail:

1 designates the felly of the wheel, 2 the spokes, 3 the hub and 4 the ordinary iron rim on the felly; 5 designates a ring composed of solid rubber that is formed with a bead 6 which enters an annular recess that corresponds with the shape of the iron rim 4 and assists in holding the ring 5 in place. 7 designates pairs of radially movable side plates which are secured to the felly 1 by means of the bolts 8 that are located in the recesses 9 in the felly. 10 designates a section of an annular ring that is formed with the curved edges 11 which are engaged by the curved ends 12 of the plates 7 for the purpose of locking these plates to the ring sections 10 when the bolts 13 are tightened. 13' designates the tire proper which is composed of a ring of solid rubber, the bead or inner edge portion 15 of which engages the inner edge of the part 11 of the rim 10. The sections of the ring 10 are secured together by means of the flexible connections 16 which may, if desired, consist of short lengths of chain similar to the ordinary sprocket chain. The ends of these chains are attached to the adjacent ends of the sections in any suitable manner, as by means of the pins 17. Located at suitable distances apart in the felly 1 are cup-shaped members 18, a detail perspective view of which is shown in Fig. 3. These cup-shaped pieces are formed with securing flanges 19 having openings to receive the bolts 20, which pass through openings in the felly 1 and the rim 4 (see Fig. 1). Located in the bottom of the cup-shaped member 18 is a cushion 21 of rubber or other suitable material; the upper surface of the cushion is engaged by the bolt 8. The cup-shaped member 18 is formed with elongated openings 22 which are diametrically located to permit the bolt 8 to move radially therein when the rubber cushion 21 is compressed by the action of the tire 13' over the roadway by reason of its direct connection with the sectional rings 10 and side plates 7. It will be seen that the short lengths of chain 16 will permit the sectional rings 10 to move independently of each other as the wheel rolls over the roadway. The bolts 13 serve to retain the ring 5 of solid rubber in place, assisted by the sectional arc-shaped pieces 10 with their flexible connections 16. It will also be noticed that the side plates 7 will have a sliding radial movement on the rim or tire 4. When the tire 13' is compressed or yields, the ring of rubber 5 will also be compressed by the bolts 13, and, in turn, the cushions 21 in the cup-shaped pieces 18 will be compressed.

It will be seen that I have produced a flexible or yielding tire construction that is very firmly constructed and one that can be readily applied and attached to the ordinary artillery wheel construction without material change. The three cushion effects will serve to distribute the load, and yet at the same time reduce the wear on the various parts.

What I claim is:

1. A cushion tire having in combination with the felly of a wheel, a rim on the felly, a plurality of cup shaped members located in the felly, a cushion in each of the members, a tire of solid rubber constituting the tread of the wheel, means for slidably connecting the tire to said members and for transmitting the blows incident to travel over the roadway to the cushions in said members.

2. A cushion tire having in combination with the rim on the felly of the wheel, a plurality of rubber cushion receiving members located in the felly, a cushion in each of the members, a tire of solid rubber constituting the tread of the wheel, means for slidably connecting the tire to said members and for transmitting the blows incident to travel over the roadway to the cushions in said members, said means including pairs of plates, a ring for attaching the tire of solid rubber thereto and a device connected to the plates and engaging the cushion of rubber in said members.

3. A cushion tire construction comprising in combination with the felly, of a rim on the felly, there being openings through the rim and felly members in the openings, a cushion in said members, a rod or bar engaging the cushion, a ring of cushion material on the rim, a tread or tire of cushion material, means for securing the tire in place, means for simultaneously transmitting the blows incident to travel over the roadway to the ring of cushion material and to the cushions in the cup-shaped members.

4. A cup-shaped member to receive a cushion device for a cushion tire having openings in its side to receive a bolt or bar for engaging the cushion device and means for securing said member to openings in the felly of a wheel, as described.

5. In a cushion tire construction for wheels for self-propelled vehicles, the combination with the felly of the wheel, a channeled rim thereon, cup-shaped members in the felly and rim and passing through the same, cushions in said members, a ring of cushion material located in the channeled rim on the outer surface of the felly, circumferentially arranged, flexibly connected plate sections for assisting in holding said cushion ring on the rim, a tire or tread member on the flexibly connected plate sections, and means for causing the blows incident to travel to be absorbed by the cushions and the ring of cushion material.

6. In a cushion tire construction for wheels for automobiles having the usual felly, a tread-member composed of solid rubber, a ring formed of sections, means for flexibly connecting the same together and upon which the tread member is mounted, means including side plates attached to the sectional ring and felly for permitting radial movement of the side plates and tread member, the felly having recesses therein and a bolt located in each of the recesses in the felly for securing the inner ends of the plates together and to the felly and for permitting radial movement of the plates and tread member, as described.

7. A tire construction for automobile wheels comprising in combination, a felly, a plurality of cushion members, the felly having notches therein, bolts in the notches, plates connected to the bolts, one of the cushion members constituting the tread of the wheel, means for transmitting the inward movements of the tread to the other cushion members including said plates having a connection with the bolts in the notches in the felly.

8. A cushion tire construction for wheels comprising, in combination, a tread proper of cushion material, a sectional ring supporting the tread, a ring of cushion material between the sectional ring and the felly of the wheel, plates attached to the sectional ring, and means for slidably attaching the plates to the inside of the felly to permit said plates to have radial movements commensurate with the inward movements of the sectional ring, and comprising recesses in the felly to receive transversely located bolts which connect the inner edges of the plates, and cushion elements engaged by the bolts, as described.

EUGENE E. REDDEN.

Copies of this patent may be obtained for five cents each, by addressing the "Commissioner of Patents, Washington, D. C."